United States Patent
Adnan et al.

(10) Patent No.: US 10,742,715 B1
(45) Date of Patent: Aug. 11, 2020

(54) INTER-PROVIDER FILE TRANSFER SYSTEM AND METHOD

(71) Applicant: Verizon Patent and Licensing Inc., Arlington, VA (US)

(72) Inventors: Khalid Adnan, Lincroft, NJ (US); Jun Yuan, Cranbury, NJ (US); Brian Somes, Richardson, TX (US); Michael Trupia, Roseland, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/539,284

(22) Filed: Aug. 13, 2019

Related U.S. Application Data

(60) Provisional application No. 62/855,444, filed on May 31, 2019.

(51) Int. Cl.
| | |
|---|---|
| *H04L 29/08* | (2006.01) |
| *H04L 29/06* | (2006.01) |
| *H04W 8/08* | (2009.01) |
| *H04W 64/00* | (2009.01) |

(52) U.S. Cl.
CPC .............. *H04L 67/06* (2013.01); *H04L 63/08* (2013.01); *H04L 63/20* (2013.01); *H04W 8/08* (2013.01); *H04W 64/00* (2013.01)

(58) Field of Classification Search
CPC ......... H04L 67/06; H04L 63/10; H04L 67/10; H04L 41/0816; H04W 36/0011; H04W 8/06; H04M 2203/053; H04M 2207/18; H04Q 2213/13389
See application file for complete search history.

(56) References Cited

U.S. PATENT DOCUMENTS

| | | | |
|---|---|---|---|
| 2014/0059118 A1* | 2/2014 | Pidady ................ | H04L 67/2814 709/203 |
| 2019/0109909 A1* | 4/2019 | Sangameshwara ..... | H04W 4/10 |
| 2020/0073963 A1* | 3/2020 | Hewitt .................. | G06F 3/0619 |

OTHER PUBLICATIONS

"RCS Interworking Guidelines IR.90," GSM Association, Version 15.0, Apr. 8, 2019, 27 pages.
"Rich Communication Suite 9.0 Advanced Communications Services and Client Specification RCC.07," GSM Association, Version 10.0, Dec. 6, 2018, 398 pages.

* cited by examiner

*Primary Examiner* — Gary Lafontant

(57) ABSTRACT

A network device may include a memory storing instructions and processor configured to execute the instructions to receive, from a first service provider, a file transfer request that includes at least a network location corresponding to a file to be transferred; determine whether the network location is internal or external to a second service provider network to which the network device belongs; modify the network location when it is determined that the network location included in the file transfer request is external to the second service provider network; retrieve the file to be transferred using the modified network location; and forward the retrieved file to a terminating user equipment (UE) device.

20 Claims, 6 Drawing Sheets

INTER-PROVIDER FILE TRANSFER SYSTEM AND METHOD

CROSS-REFERENCE TO RELATED APPLICATION

This application claims priority under 35 U.S.C. § 119, based on U.S. Provisional Patent Application No. 62/855,444 filed May 31, 2019, the disclosure of which is hereby incorporated by reference herein.

BACKGROUND INFORMATION

Rich Communication Service (RCS) is a communication protocol that supports Internet Protocol (IP)-based communication between end devices and across different mobile telephone service providers. Envisioned as a replacement for legacy short message service (SMS) messages and an alternative to third-party over-the-top OTT messaging applications, RCS provides a communication system that, in addition to text-based messages, also supports IP voice and video calls, group chats, file transfers, etc. Designing an RCS system to be cross-platform and carrier agnostic, and that facilitates efficient and secure handling of communications between customers of different service providers has proven challenging.

DETAILED DESCRIPTION OF PREFERRED EMBODIMENTS

The following detailed description refers to the accompanying drawings. The same reference numbers in different drawings identify the same or similar elements. As used herein, the terms "user," "consumer," "subscriber," "party," and/or "customer" may be used interchangeably. Also, the terms "user," "consumer," "subscriber," "party," and/or "customer" are intended to be broadly interpreted to include a user device or a user of a user device.

Consistent with embodiments described herein, a device in an inter-provider communication system may receive a file transfer message from a device in another service provider network. Upon receipt of the message, the receiving device may initially determine whether the message has been received from a device within its own network or from an external network. When it is determined that the message was received from a device in an external network, the receiving device may modify at least a portion of the information contained within the received message to reflect that the message comes from outside of the service provider network. Based on the modified information, and in contrast with internal network file transfer requests, the receiving device may initiate a mutual authentication session with the originating service provider network device to retrieve the file to be transferred.

Figure 1:
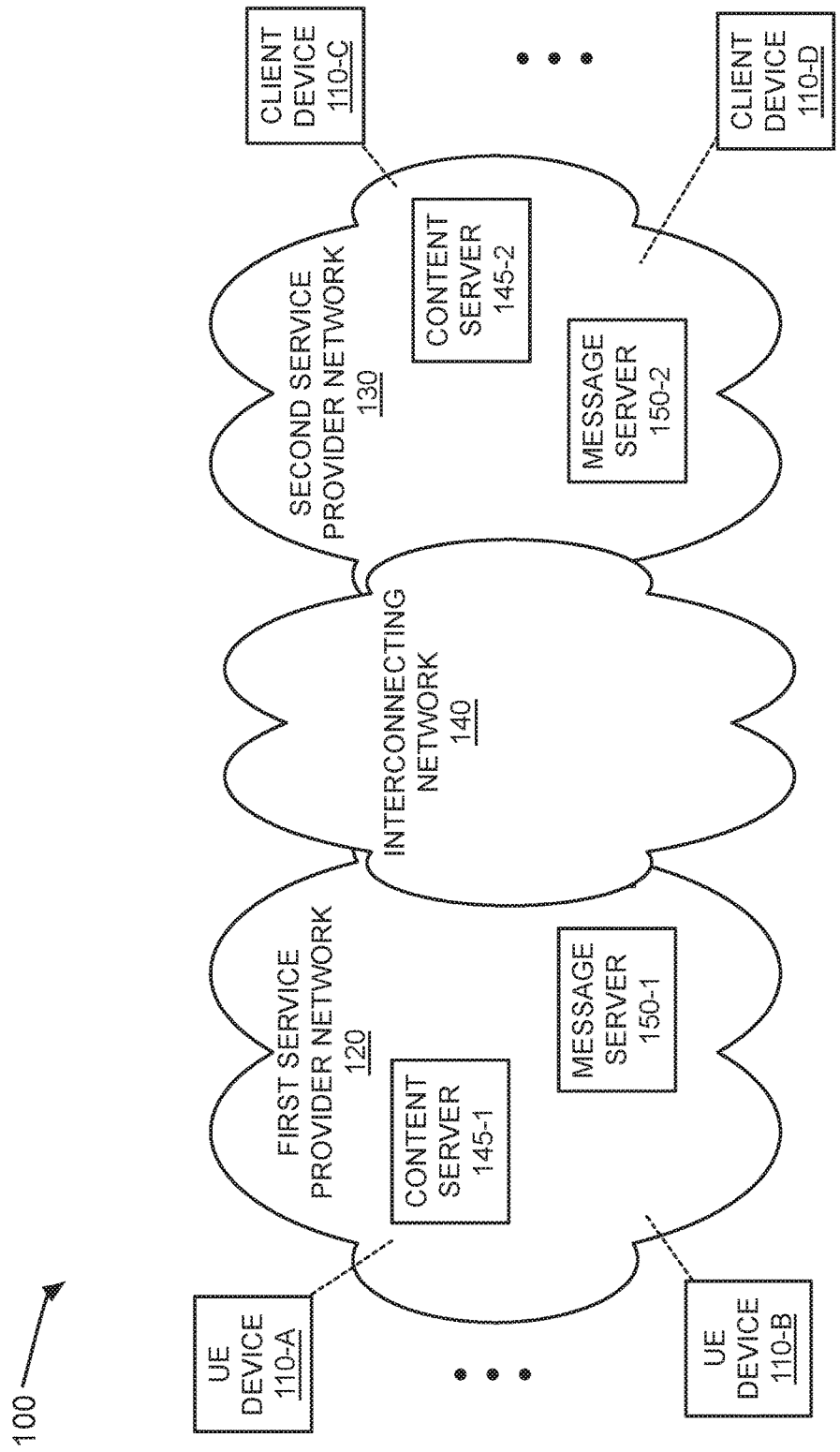
FIG. 1 is a diagram of an exemplary environment in which the systems and/or methods, described herein, may be implemented.

FIG. 1 is a diagram of an exemplary environment 100 in which the systems and/or methods, described herein, may be implemented. As shown in FIG. 1, environment 100 may include user equipment (UE) devices 110-A to 110-D (referred to herein collectively as "UE devices 110" and individually as "UE device 110"), a first service provider network 120, a second service provider network 130, and an interconnecting network 140. In one implementation, each provider network 120/130 includes multiple network devices, including at least one content server 145-1 and 145-2 (referred to herein collectively as "content servers 145" and individually as "content server 145) and at least one messaging server 150-1 and 150-2 (referred to herein collectively as "messaging servers 150" and individually as "messaging server 150"). Content server 145 and messaging server 150 may be referred to herein collectively as "network devices 145/150." The particular arrangement and number of components of environment 100 shown in FIG. 1 are illustrated for simplicity. In practice there may be more UE devices 110, networks 120/130, and network devices 145/150. Additionally, environment 100 may contain fewer components, different components, differently arranged components, or additional components than depicted in FIG. 1. For example, although not shown, environment 100 may include various elements or components for providing or facilitating messaging and media transfer related services, consistent with embodiments described herein. Components of environment 100 may be connected via wired and/or wireless links.

UE devices 110 may include any type of device that is able to transmit and receive data, such as text data, video data, image data, audio data, multimedia data, etc. For example, UE devices 110 may include some type of computer, such as a personal computer (PC), a tablet computer, a laptop computer, etc., a personal digital assistant (PDA), a web-based appliance, a mobile terminal (e.g., a cellular telephone), etc.

Furthermore, users of UE devices 110 may be subscribers to telephony services provided in association with different carrier networks. As shown in FIG. 1, UE devices 110-A and 110-B may be associated with first service provider network 120 and UE devices 110-C and 110-N may be associated with second provider network 130. In some embodiments, the association between UE devices 110 and service provider networks 120/130 may be as visitor roaming onto the particular service provider network 120/130. Consistent with embodiments described herein, UE devices 110 may include one or more messaging or communication clients for transmitting or receiving file transfers.

Consistent with embodiments described herein, each of service provider networks 120 and 130 may include a wireless network. For example, service provider networks 120/130 may be implemented to include a Long Term Evolution (LTE) network (i.e., a fourth generation (4G) wireless infrastructure), an LTE Advanced network, a fifth generation (5G) wireless network, or a future generation wireless network architecture. Service provider networks 120/130 may further comprise one or more wireless public land mobile networks (PLMNs). The PLMN(s) may include a Code Division Multiple Access (CDMA) 2000 PLMN, Global System for Mobile Communications (GSM) PLMN, Long Term Evolution (LTE) PLMN, and/or other types of PLMNs not specifically described herein.

Each of service provider networks 120/130 may be operated by one or more of a mobile network operator (MNO), a mobile phone operator, a carrier service provider (CSP), a wireless service provider, a wireless carrier, a cellular company, and/or any other company that provides mobile phone service(s) to users (e.g., subscribers of the carrier) via a network. In some implementations, service provider networks 120/130 may provide cellular phone service within a particular geographical area (e.g., the United States of America (USA)). Furthermore, each of service provider networks 120/130 may include a heterogeneous network that includes wireless stations of different types, including macro base stations and different types of small cells (not shown in FIG. 1). Although not shown in FIG. 1, service provider networks 120/130 include a number of devices and network components for facilitating communication between UE devices 110 consistent with one or more access network technologies (e.g., 4G LTE, 5G, etc.).

Interconnecting network 140 includes a network that provides an interconnection service between service provider networks 120 and 130. For example, interconnecting network 140 may be implemented as an Internetwork Packet Exchange (IPX)/Sequenced Packet Exchange (SPX) network, an Internet Protocol (IP) exchange (IPX) network, or another suitable network that may provide an interconnection service. Consistent with embodiments described herein, interconnecting network 140 may treat all traffic (e.g., session initiation protocol (SIP) or message server relay protocol (MSRP) traffic) as pass through traffic without differentiating between different types of traffic. Signaling and interfaces between a UE device 110 and the network to which it is attached is referred to as the user-to-network interface (UNI), while signaling and interfaces between network devices of different provider networks is referred to as the network to network interface (NNI). In some implementations, such as those described herein, it is advantageous to differentiate functional processing of media communications differently for NNI interactions than for UNI interactions.

As shown in FIG. 1, to support IP-based messaging and message-based file transfer services, each of service provider networks 120/130 include one or more messaging servers (MS) 145 and content servers (CS) 150. In some implementations, messaging servers 145 may be executed as application servers (AS) or application functions (AF) (such as virtualized application functions) to support messaging between UEs 110, such as via rich communication service (RCS) messages, which may be based on SIP and/or MSRP messages. Similarly, content servers 150 may likewise by executed as shared storage devices or logical storage device functions, depending on provider network implementation. In any event, consistent with embodiments described herein, each of content servers 150 include a number of discretely addressable locations that may be resolved across interconnecting network 140 depending on the nature of the requested communication. In the context of the present implementation, file transfer requests received from an external service provider network may resolve to a different interface (e.g., IP address) than file transfer requests received from within the same service provider network.

Figure 2:
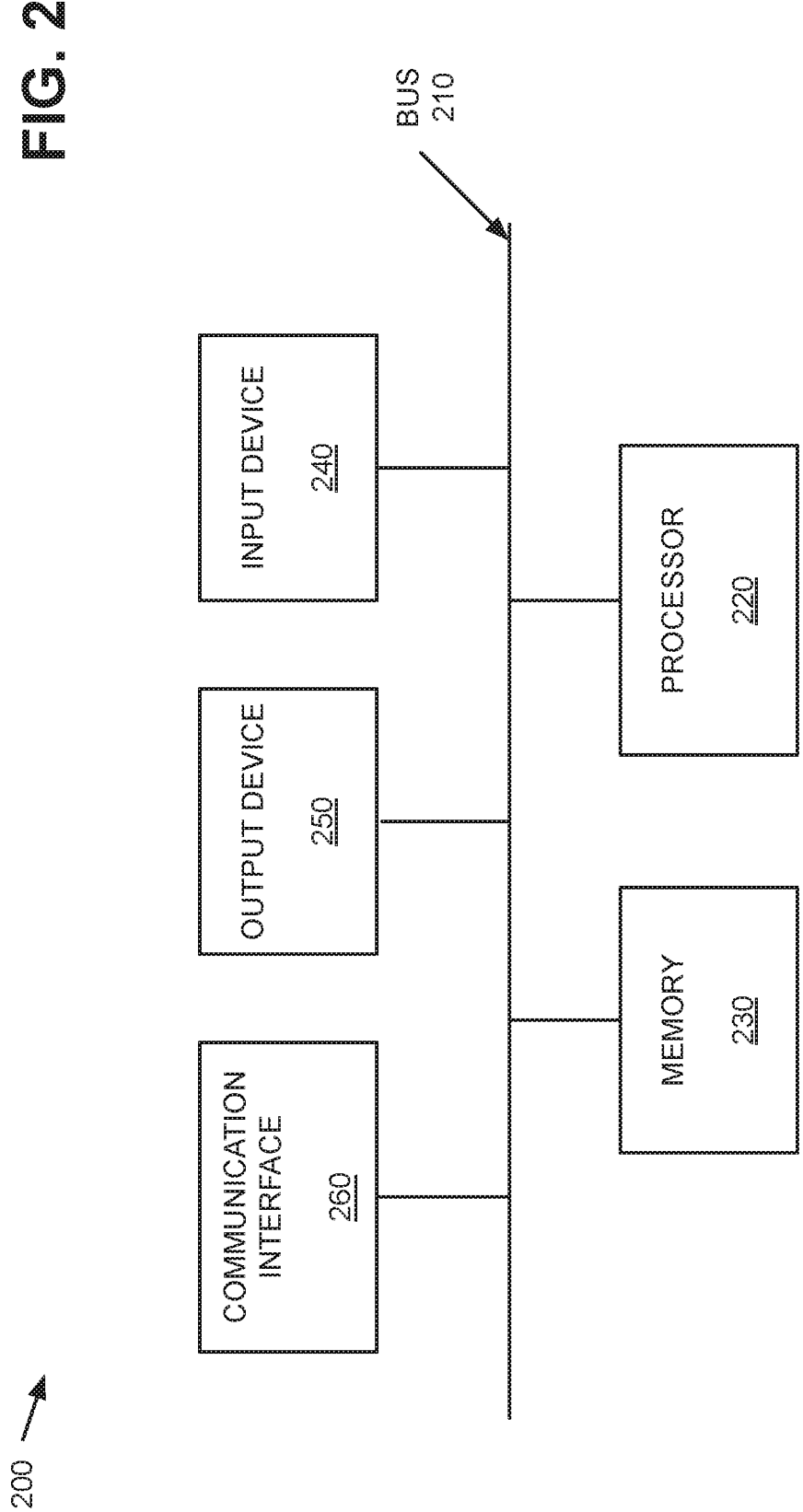
FIG. 2 is a diagram of example components of a device consistent with embodiments described herein.

FIG. 2 is a diagram of example components of a device 200. Each of UEs 110 and network devices 145/150 may include one or more devices 200. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
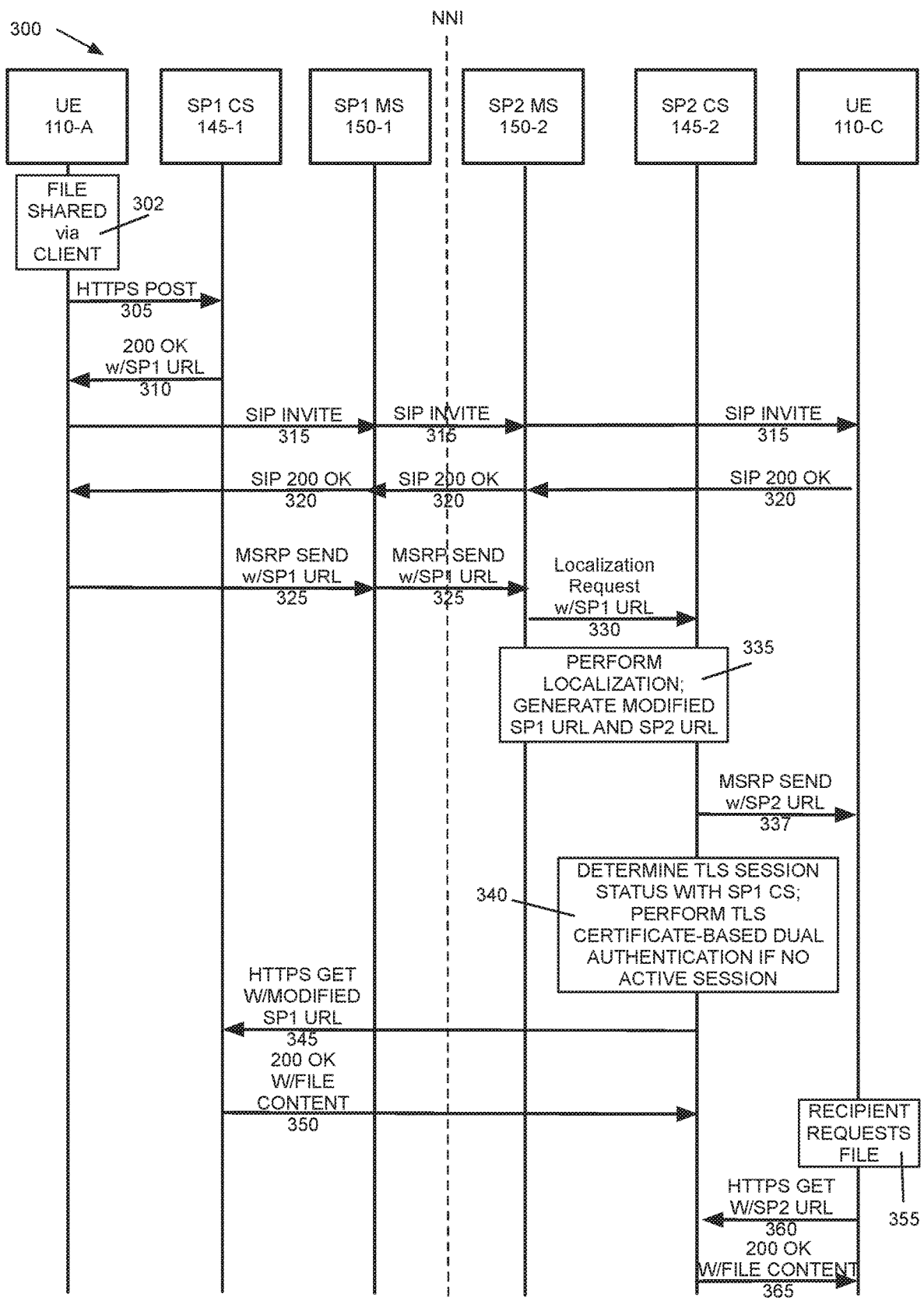
FIG. 3 is a diagram of an exemplary signal flow that depicts exemplary interactions between a portion of the components of the environment of FIG. 1.

FIG. 3 is a diagram of an exemplary signal flow 300 that depicts exemplary interactions between a portion of the components of environment 100 described above in accordance with FIG. 1. It should be understood that the signaling depicted FIG. 3 is abbreviated to highlight concepts described herein and that, in practice, additional signals/messages beyond those shown in FIG. 3 are exchanged to support the requested services or interactions.

As shown in FIG. 3, signal flow 300 may include UE device 110-A, attached to first service provider network 120, receiving a user request to transfer a file to UE device 110-C, which is attached to second service provider network 130 (element 302). In response, the messaging client on UE device 110-A sends a HTTPS POST message (305) to first service provider (SP1) Content Server (CS) 145-1 that includes the file to be transferred.

Assuming that the requirements for file transfers have been met in accordance with the messaging platform being used (e.g., RCS, etc.), such as authentication requirements, file size, etc. and that the file to be transferred has been successfully uploaded, SP1 CS 145-1 transmits a 200 OK message (310) to UE 110-A that includes at least a network location, such as a uniform resource locator (URL) from which the file may be retrieved. In some implementations, message 310 may also include additional information, such as a thumbnail URL, a validity timeframe for the file, etc.

Consistent with implementations described herein, the URLs may be associated with the capabilities of interconnecting network 140 and may include a particular format of domain and subdomain consistent with the messaging platform being used. For example, when interconnecting network 140 comprises an IPX and the messaging platform is RCS, all URLs associated with RCS messaging may take the form https://rcs.mnc###.mcc %%%.pub.3gppnetwork.org/ [file path], where ### designates the mobile network code (MNC) and %%% designates the mobile country code (MCC) corresponding to SP1. Additional subdomains are supported for different RCS services. Accordingly, for file transfer services, the URLs would take the form https://ftcontentserver.rcs.mnc###.mcc %%%.pub.3gppnetwork.org/[file path].

Upon receipt of the URL, UE 110-A transmits a SIP INVITE message (315) to SP1 message server (MS) 150-1 indicating that UE 110-A requests a file transfer to UE 110-C. SP1 MS 150-1 relays message 315 to second service provider (SP2) MS 150-2 via interconnecting network 140 and SP2 MS 150-2 relays message 315 to UE 110-C. Assuming that UE 110-C accepts the file transfer request, UE 110-C returns a SIP 200 OK message 320 to UE 110-A via SP2 MS 150-2 and SP1 MS 150-1. UE 110-A then transmits a MSRP SEND message (325) to SP1 MS 150-1 that includes at least the identity of UE 110-C and the file URL received from SP1 CS 145-1. SP1 MS 150-1 forwards the MSRP SEND message 325 to SP2 MS 150-2 via interconnecting network 140.

In response to the MSRP send message 325, the receiving SP2 MS 150-2 requests (330) localization (block 335) of the file transfer request based on the received SP1 URL. For the purposes of file transfer requests, localization refers to the process of using local provider-controlled resources to make files available to local subscribers. So, in the example of FIG. 3, localization includes providing a local SP2 network URL (referred to as SP2 URL) to UE 110-C for use in retrieving the transmitted file. Although depicted in FIG. 3 as being performed by SP2 CS 145-2, localization may, in some implementations, be performed by SP2 MS 150-2 or by a separate functional element that operates outside of SP2 MS 150-2 or SP2 CS 145-2. Following localization, the initially received file transfer MSRP SEND message 325 is updated with the SP2 URL and transmitted to UE 110-C as MSRP SEND message (337).

During localization, and consistent with implementations described herein, the received SP1 URL is checked to determine whether the file is from inside the service provider network (i.e., the UNI) or outside of the service provider network (i.e., the NNI). For example, when the messaging platform is RCS and the interconnecting network 140 comprises an IPX, the MNC code in the URL may be compared to a SP2s MNC code. In some implementations, the service provider network may include multiple MNC codes, and localization may include comparing the received SP1 URL against each of the codes. When it is determined that the SP1 URL is from a different service provider network, localization includes prepending an additional subdomain to the received SP1 URL. As an example, the phrase "nni" may be prepended to the received SP1 URL, thus generating a modified SP1 URL of the format https://nni.ftcontentserver-.rcs.mnc###. mcc %%%. pub.3gppnetwork.org/[file path].

Consistent with embodiments described herein, when it has been determined that the file to be transmitted is of external origin and a modified URL has been generated, SP2 CS 145-2 may determine whether a dual (also referred to as mutual) authentication session is in effect with SP2 CS 145-1. For example, a suitable dual authentication session may include a transport layer security (TLS) session having a particular session period. During this session period, additional authentication may not need to be performed. If no current session is in effect, SP2 CS 145-2 may initiate a dual authentication session with SP1 CS 145-1 based on the modified SP1 URL. For example, a TLS dual authentication session may be established with SP1 CS 145-1 in which SP1 CS 145-1 verifies SP2 CS 145-2's digital certificate and SP2 CS 145-2 verifies SP1 CS 145-1's digital certificate and the two entities generated a shared secret key for the purpose of continued mutual authentication.

Once dual authentication has been confirmed and/or performed (element 340 in FIG. 3), SP2 CS 145-2 transmits a file request message (345) to SP1 CS 145-1 using the modified URL. For example, SP2 CS 145-2 may transmit an HTTPS GET message (encrypted using the TLS session key) to SP1 CS 145-1. Consistent with embodiments described herein, SP1 CS 145-1, upon receipt of the HTTPS GET request at the modified URL confirms that the request is authentic, such as by authenticating the GET message with the shared secret key and sends a return message (350) that includes the identified file, encrypted using shared secret key. The file to be transmitted is now stored at SP2 CS 145-2, which is available for retrieval by UE 110-C at the SP2 URL.

Next, the user of UE 110-C selects to retrieve or view the file (element 355 in FIG. 3). In some embodiments, such a retrieval selection may be automatically performed for certain file types or certain UE client settings. In response to such a selection, UE 110-C transmits a file request message (360) to SP2 CS 145-2 that includes the received SP2 URL. For example, UE 110-C transmits an HHTPS GET message to SP2 CS 145-2. In response, SP2 CS 145-2 returns a message (365) that includes the requested file. For example, SP2 CS 145-2 returns an HTTPS 200 OK message that includes the requested file.

As described above, by differentiating file transfer processing between UNI and NNI sources, service provider networks are provided with the ability to designate separate authentication method for NNI file transfer requests than for UNI file transfer requests, to identify separate performance indicators for NNI vs UNI at the content server, by virtue of the different URLs at which the files are retrieved, and to generally handle NNI traffic differently from UNI traffic.

Figure 4:
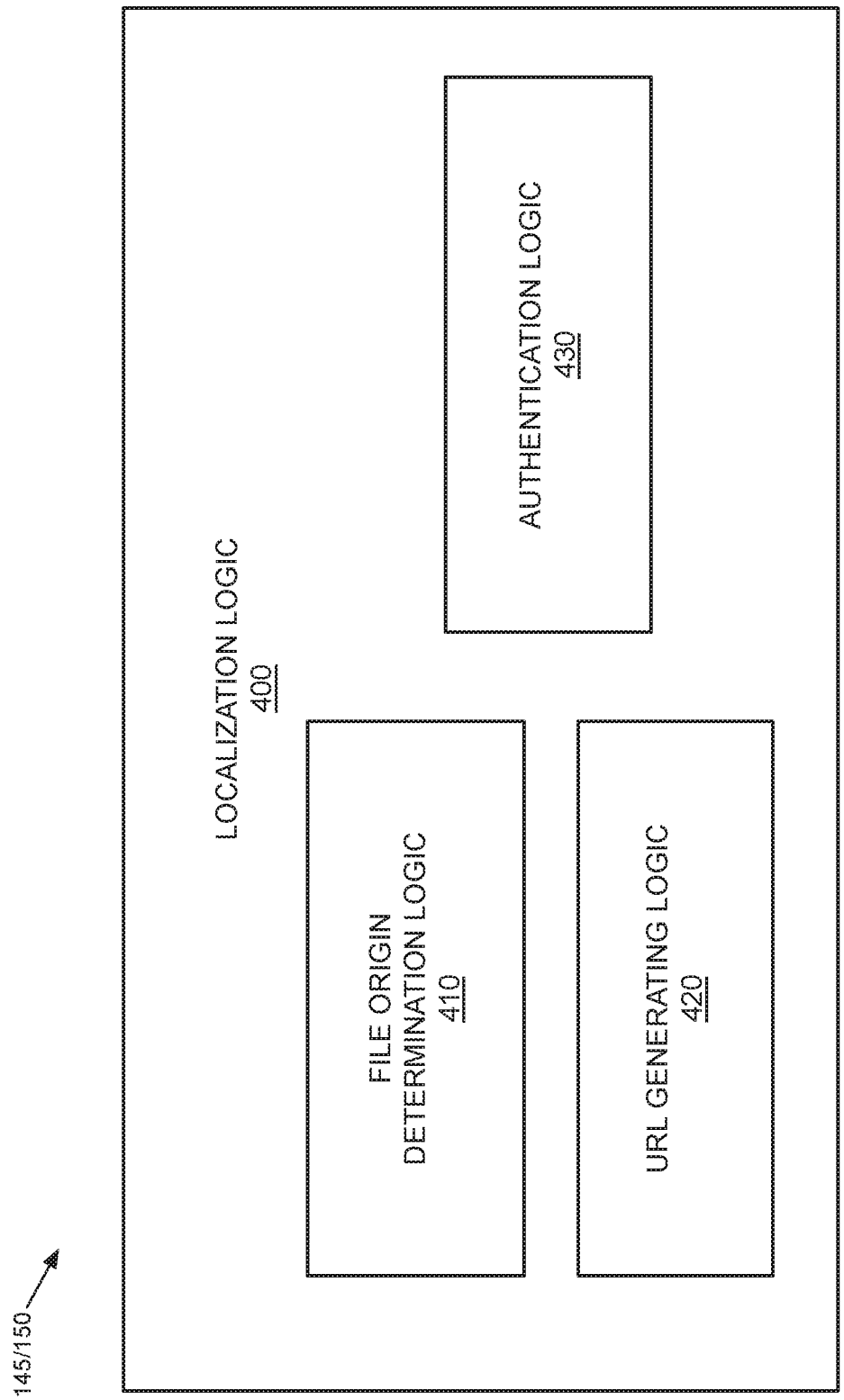
FIG. 4 is a block diagram of exemplary components of localization logic consistent with embodiments described herein.

FIG. 4 is a block diagram of exemplary functional components of localization logic 400 (e.g., stored in memory 230 of one or more of MS 150 or CS 145). As shown, localization logic 400 includes file origin determination logic 410, URL generating logic 420, and authentication logic 430. The configuration of components of localization logic 400 in FIG. 4 is for illustrative purposes. Localization supporting components within provider networks 120/130 may include additional, fewer and/or different components than those depicted in FIG. 4.

File origin determination logic 410 includes logic configured to ascertain a location of a file within an interconnecting network environment (e.g., an IPX network). In particular, file origin determination logic 410 may extract a network identifier from a network file location received in a file send request message, such as MSRP SEND message 325 described above. In an exemplary implementation, the network identifier may include an MNC code that is included in a standardized subdomain for IPX network addresses. File origin determination logic 410 may compare the extracted network identifier against one or more network identifier associated with the service provider with which localization logic 400 is associated. In some implementations, the location determination is a binary determination, indicative of whether the file transfer request is of internal or external origin. In other embodiments, the extracted network identifier may be compared to a listing of service provider identifiers to identify a particular service provider from which the file transfer request is received. In this manner, different localization procedures may be enforced depending on the identified service provider.

URL generating logic 420 includes logic for modifying or generating uniform resource locators based on the output of file origin determination logic 410. For example, as described above, URL generating logic 420 may be configured to modify a file location URL received in a file transfer request when it is determined that the origin of the file is external to its own network. In particular, consistent with embodiments described herein, URL generating logic 420 may be configured to modify the received file location URL by prepending a predefined string as a subdomain to the received file location URL. File requests to the modified URL are resolved by appropriate IPX domain name servers to point to a same content server as the originating content server, but with the added capability of tracking and processing external (NNI) file requests differently from internal (UNI) file requests.

In other implementations, a number of different strings may be prepended based on an identification of the source network. Although such an embodiment requires the cooperation of the different networks, based on such cooperation, different localization procedures may be performed for different service provider networks, such as different authentication types, different session lengths, etc.

In addition to modifying the originating file transfer URL, URL generating logic 420 may be further configured to generate a local URL on the local content server (e.g., CS 145-2 in FIG. 3). Contrary to the original file location URL received via the interconnecting network 140, localized URLs may be provided in any suitable format for retrieving file content within a service provider network.

Authentication logic 430 may be configured to confirm, negotiate, and authenticate secure sessions with an external content server. As described above, in one implementation, when file origin determination logic 410 determines that a received file location is external to its service provider network and URL generating logic 420 modifies the URL of the received file location to reflect this determination, authentication logic 430 is configured to apply authentication policies based on the modified URL. For example, authentication logic 430 is configured to require dual authentication with external content servers, as identified in the modified URL format described above.

Figure 5:
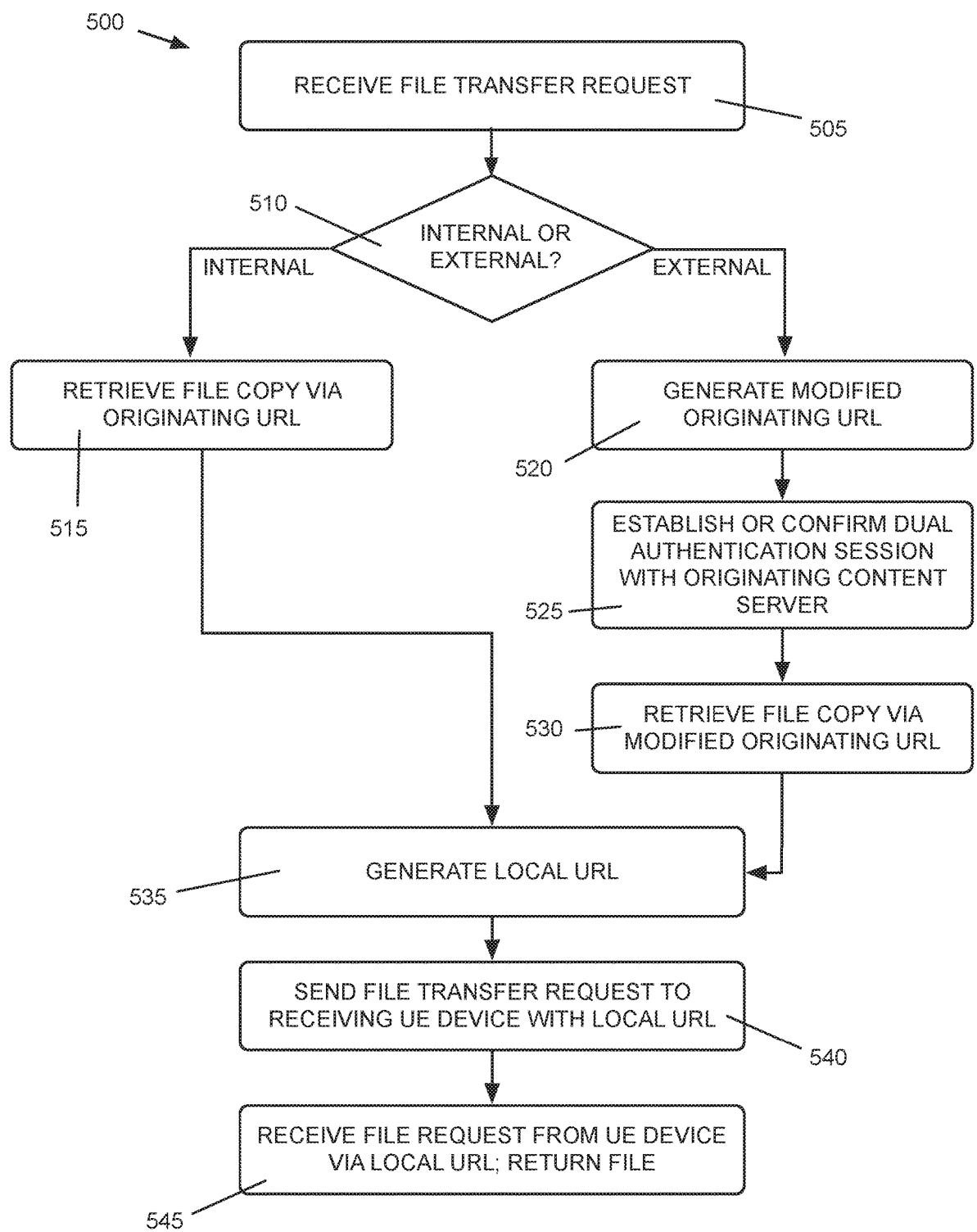
FIGS. 5 and 6 are flowcharts of processes for providing a file transfer service according to embodiments described herein.

FIG. 5 is a flowchart of a process 500 for providing a file transfer service according to an implementation described herein. In some implementations, the process of FIG. 5 may be performed by one or more devices within service provider networks 120/130, such as by logical elements within content servers 145 and message servers 150 described above. In other implementations, some or all of the process of FIG. 5 may be performed by another device (either discrete or virtual) or a group of such devices separate from message server 150 and/or content server 145.

The process of FIG. 5 may include receiving a file transfer request from another message server (block 505). For example, as described above, in the context of an RCS-based file transfer request, SP2 MS 150-2 may receive an MSRP SEND message that includes, among other things, a URL corresponding to a network location for the file that is accessible via interconnecting network 140.

Upon receipt of the file transfer request, it is determined whether the file is of external or internal origin relative to the receiving service provider network (block 510). For example, file origin information, such as a mobile network code (MNC) is extracted from the request and compared to the MNC of the receiving service provider network. If it is determined that the file is of internal origin, e.g., the MNC of the received file URL designates a service provider that is the same as the service provider of the receiving network (block 510—internal), a copy of the file to be transferred is retrieved via the received file URL (block 515). For example, the receiving network content server (e.g., SP2 CS 145-2) sends a HTTP GET message to the received URL and receives the file in a responsive 200 OK message.

Alternatively, when it is determined that the file is of external origin, e.g., the MNC of the received file URL designates a service provider that is different from the service provider of the receiving network (block 510—external), the received URL is modified to generate a modified originating URL (block 520). For example, as described above, localization function 400 modifies the originating URL by prepending a predefined string as an additional subdomain. Accessing the modified the URL still resolves to the originating content server, but to an agreed upon and predefined different interface (e.g., IP address). Consistent with implementations described herein, this different interface may be configured to include additional security requirements or other processing or monitoring functions. In some implementations, such additional security processing may include dual authentication, in which an identify of the receiving network content server is authenticated to the originating network content server and vice-versa. Such dual authentication is not traditionally performed for internal file transfer requests.

Next, pursuant to the predefined requirements for external file transfer requests, a secure dual authentication security session may be established (or confirmed) between the receiving content server and the originating content server via the modified originating URL (block 525). For example, a dual authentication TLS session may be established with the originating content server 145-1 using the modified originating URL. Once the security session is confirmed, a copy of the file to be transferred is retrieved via the modified originating URL (block 530).

Next, for both internal and external requests, a local URL for the retrieved file is generated (block 535) and a version of the file transfer request is sent to the receiving UE device (block 540). As described above, localization function 400 may generate a local URL for use by UE device 110-C and transmit the file transfer request with the local URL in an MSRP SEND message. The receiving content server receives a request to download the file from the destination UE device via the local URL and provides the stored file in response (block 545).

Figure 6:
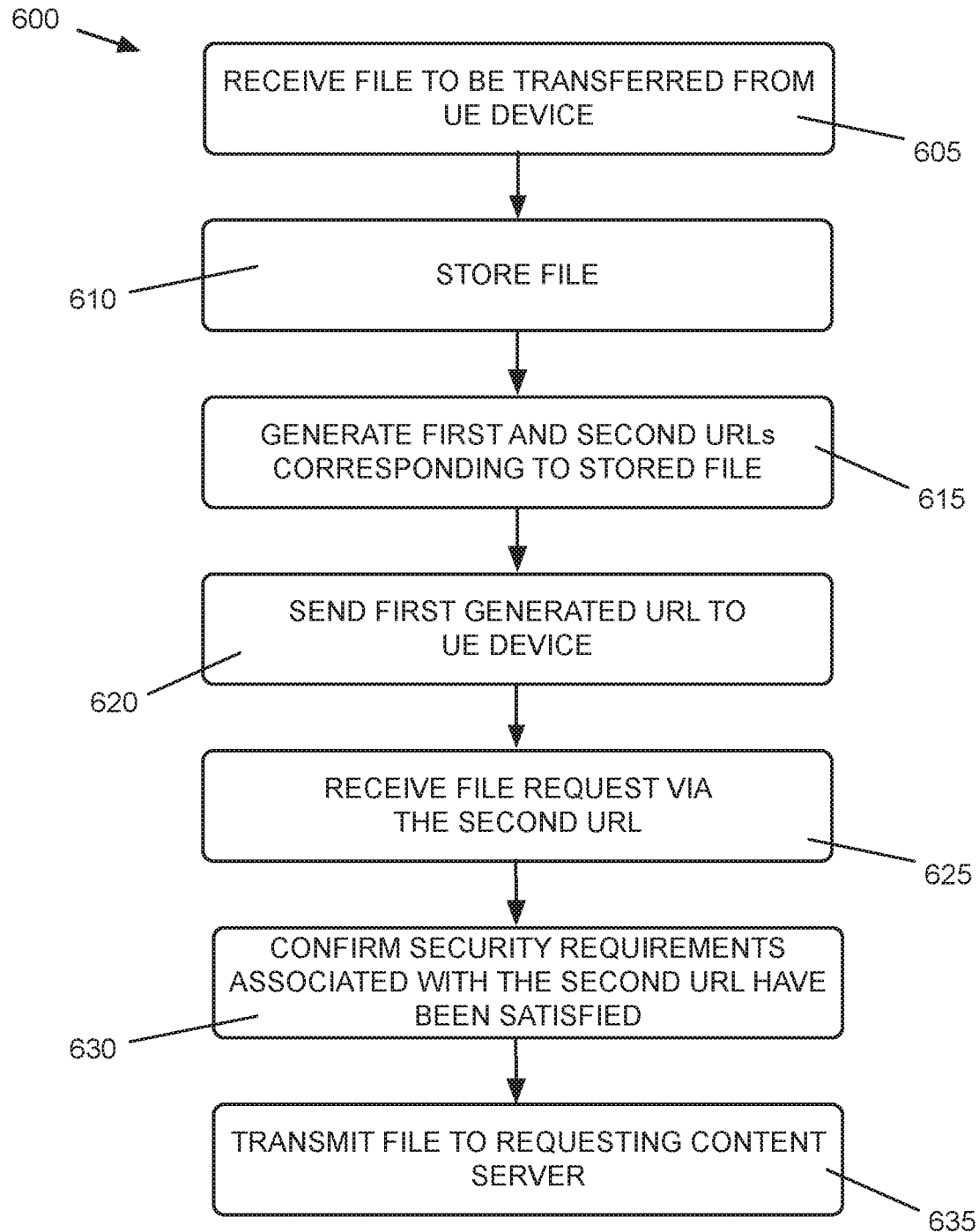

FIG. 6 is a flowchart of a process 600 for providing a file transfer service according to an implementation described herein. In some implementations, the process of FIG. 6 may be performed by one or more devices within service provider networks, such as by logical elements within content servers 145 and message servers 150 described above. In other implementations, some or all of the process of FIG. 6 may be performed by another device (either discrete or virtual) or a group of such devices separate from message server 150 and/or content server 145.

The process of FIG. 6 may include receiving a file to be transferred from a UE device or a client on a UE device (block 605). For example, as described above, a user of UE device 110-A may transmit a file to a content server (e.g., SP1 CS 145-1) for transfer to another UE device, such as via a HTTPS POST message. In response, the content server stores the requested file to be transferred (block 610) and generates first and second URLs corresponding to the stored file location (block 615). Consistent with embodiments described herein, the first URL may be referred to as the originating URL and is intended for intra-network file transfers (i.e., within a service provider network) and the second URL may be referred to as the modified originating URL and is intended for inter-network file transfers (i.e., between different service provider networks). For example, as described above, the second URL may include a predefined subdomain of the first URL. As also described above, requests made to each of the first and second URLs may resolve to the same file location but may include different security requirements or monitoring functions.

Assuming that the file upload is successful, the content server responds to the requesting UE device by sending a return message includes the originating URL corresponding to the file location on the content server (block 620). Next, the originating content server receives a request for the stored file via the second URL (the modified originating URL) (block 625). Consistent with embodiments described herein, the originating content server verifies that security requirements associated with the modified originating URL have been satisfied (e.g., a dual authentication session) (block 630) and, if so, transmits the stored file to the requesting content server (block 635).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of signals have been described with respect to FIG. 3 and a series of blocks have been described with respect to FIGS. 5 and 6, the order of the signals and/or blocks may be modified in other implementations. Further, non-dependent signals and/or blocks may be performed in parallel, were appropriate.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, from a first service provider and by a second service provider, a file transfer request that includes at least a network location corresponding to a file to be transferred;
   determining, by the second service provider, whether the network location is internal or external to a second service provider network;

modifying, by a second message server, the network location when it is determined that the network location included in the file transfer request is external to the second service provider network;

retrieving the file to be transferred using the modified network location; and forwarding the retrieved file to a terminating user equipment (UE) device.

2. The method of claim 1, wherein the network location includes an identifier corresponding to an originating network in which the file to be transferred is stored.

3. The method of claim 2, wherein the identifier corresponding to an originating network comprises a mobile network code (MNC).

4. The method of claim 2, wherein determining whether the network location is internal or external comprises comparing the identifier in the received network location to an identifier of the second service provider network.

5. The method of claim 1, wherein modifying the network location comprises adding a predefined subdomain to the received network location.

6. The method of claim 5, wherein the adding of the predefined subdomain comprises prepending a predefined string to the received network location.

7. The method of claim 1, further comprising:

determining security requirements corresponding to the modified network location;

establishing or confirming that the security requirements have been satisfied; and retrieving the file to be transferred using the modified network location when the security requirements have been satisfied.

8. The method of claim 7, wherein the security requirements corresponding to the modified network location comprise a dual authentication security session.

9. The method of claim 1, wherein the file transfer request comprises a messaging server relay protocol (MSRP) SEND message.

10. The method of claim 1, further comprising:

generating a local network location corresponding to the file to be transferred;

modifying the file transfer request to include the local network location;

forwarding the modified file transfer request to the terminating UE device;

receiving a request to download the file from the terminating UE device based on the local network location; and forwarding the retrieved file to the terminating UE device.

11. A network device comprising:

a memory storing instructions; and a processor configured to execute the instructions to:

receive, from a first service provider, a file transfer request that includes at least a network location corresponding to a file to be transferred;

determine whether the network location is internal or external to a second service provider network to which the network device belongs;

modify the network location when it is determined that the network location included in the file transfer request is external to the second service provider network;

retrieve the file to be transferred using the modified network location; and forward the retrieved file to a terminating user equipment (UE) device.

12. The network device of claim 11, wherein the network location includes an identifier corresponding to an originating network in which the file to be transferred is stored.

13. The network device of claim 12, wherein the identifier corresponding to an originating network comprises a mobile network code (MNC).

14. The network device of claim 12, wherein the processor to determine whether the network location is internal or external is further configured to compare the identifier in the received network location to an identifier of the second service provider network.

15. The network device of claim 11, wherein the processor to modify the network location is further configured to add a predefined subdomain to the received network location.

16. The network device of claim 15, wherein the adding a subdomain comprises prepending a predefined string to the received network location.

17. The network device of claim 11, wherein the processor is further configured to execute instructions to:

determine security requirements corresponding to the modified network location;

establish or confirm that the security requirements have been satisfied; and retrieve the file to be transferred using the modified network location when the security requirements have been satisfied.

18. The network device of claim 17, wherein the security requirements corresponding to the modified network location comprise a dual authentication security session.

19. A non-transitory, computer-readable storage media storing instructions executable by one or more processors of one or more devices, which when executed cause the one or more devices to:

receive, from a first service provider, a file transfer request that includes at least a network location corresponding to a file to be transferred;

determine whether the network location is internal or external to a second service provider network;

modify the network location when it is determined that the network location included in the file transfer request is external to the second service provider network;

retrieve the file to be transferred using the modified network location; and forward the retrieved file to a terminating user equipment (UE) device.

20. The non-transitory, computer-readable storage media of claim 19, wherein the instructions, when executed, further cause the one or more devices to:

determine security requirements corresponding to the modified network location;

establish or confirm that the security requirements have been satisfied; and retrieve the file to be transferred using the modified network location when the security requirements have been satisfied.

* * * * *